United States Patent [19]
Elizabeth

[11] 4,248,818
[45] Feb. 3, 1981

[54] PROCESS FOR MAKING A RECORD

[76] Inventor: Kathleen Elizabeth, Rte. 1, Box 149, Billings, Mont. 59102

[21] Appl. No.: 973,872

[22] Filed: Dec. 28, 1978

[51] Int. Cl.² .................. B29C 9/00; B29C 17/00; B29D 17/00
[52] U.S. Cl. .................. 264/107; 264/247; 264/255; 425/116; 425/810; 249/83
[58] Field of Search .............. 425/135, 116, 810, 391; 264/245, 246, 247, 241, 255, 107; 249/83, 91

[56] References Cited
U.S. PATENT DOCUMENTS

| | | | |
|---|---|---|---|
| 2,862,233 | 12/1958 | Brown | 425/810 |
| 3,113,905 | 12/1963 | Rosen | 425/810 |
| 3,122,598 | 2/1964 | Berger | 264/247 |
| 3,270,101 | 8/1966 | Jardine et al. | 264/247 X |
| 3,518,146 | 6/1970 | Plympton | 264/247 X |
| 3,526,690 | 9/1970 | Bachman | 425/135 X |
| 3,635,622 | 1/1972 | Weschsler | 425/810 |
| 3,662,051 | 5/1972 | Harlow | 425/810 |
| 3,839,129 | 10/1974 | Neumann | 264/247 X |

*Primary Examiner*—J. Howard Flint, Jr.
*Attorney, Agent, or Firm*—Koda & Androlia

[57] ABSTRACT

A process for making a plastic record including the ordered steps of placing a cake of transparent moldable plastic in a record press having grooves for impressing sound grooves into the plastic, placing on opaque sheet of material having a picture printed thereon on at least one side onto the cake in the record press, placing a transparent moldable plastic on top of the opaque sheet of material and pressing the combined cake, sheet and transparent plastic in the record press whereby a transparent record having a picture and sound grooves contained therein is formed.

6 Claims, 4 Drawing Figures

PROCESS FOR MAKING A RECORD

BACKGROUND OF THE INVENTION

1. Field of the Invention

This invention relates to phonograph records and more particularly to methods for making phonograph records.

2. Prior Art

In the prior art, phonograph records have been generally made from an opaque material. In recent years, it has become desirable to place pictures directly on the phonograph record. The initial attempts were only small pictures and were printed on a paper label which was affixed to the record by an adhesive in the central area where there are no grooves present. Since this is a very limited area, such a process is undesirable.

Since it is desirable to have a larger picture area and the picture itself cannot be affixed to the entire exterior of the record because the paper or other material from which the picture is printed on will cover the sound grooves, it has been proposed that the picture be placed in the interior of the record and the record be made from a transparent material. To accomplish this feat, it has been proposed that the record be made into two halves and that the two halves be then bonded together with the picture in between. Such a process is undesirable because it requires two pressings, it is more expensive and the record may delaminate with age.

SUMMARY OF THE INVENTION

Accordingly, it is a general object of the present invention to provide a process for making a transparent record having a picture therein which is simple and low in cost.

It is another object of the present invention to provide a process for making a record with a picture contained therein which is durable.

In keeping with the principles of the present invention, the objects are accomplished by a process for making a plastic record which includes the ordered steps of placing a cake of transparent moldable plastic in a record press having grooves for impressing sound grooves into the plastic, placing an opaque sheet of material having a picture printed thereon on at least one side on the cake in the record press, placing a transparent moldable plastic on top of the opaque sheet of material and pressing the combined cake sheet and transparent plastic in the record press whereby a transparent record having a picture and sound grooves contained therein is formed.

BRIEF DESCRIPTION OF THE DRAWINGS

The above-mentioned features and objects of the present invention will become more apparent with reference to the following description taken in conjunction with the accompanying drawings wherein like reference numerals denote like elements and in which.

DETAILED DESCRIPTION OF THE INVENTION

Figure 1:
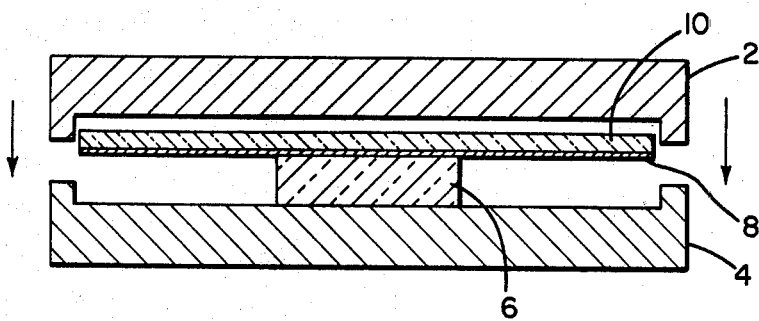
FIG. 1 is a cross sectional view illustrating one step of a first embodiment of a process for making a plastic record in accordance with the teachings of the present invention.
Figure 2:
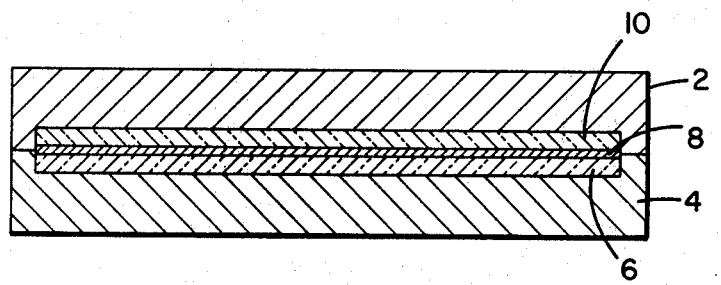
FIG. 2 is a cross sectional view illustrating a second step of a process for making a plastic record in accordance with the teachings of the present invention.

Referring more particularly to the drawings, shown in FIGS. 1 and 2 is a process for making plastic records in accordance with the teachings of the present invention. In FIG. 1 is shown a movable mold from a molding press which includes a upper half 2 and a lower half 4. Contained in both the upper half 2 and the lower half 4 is a pattern for a record which includes the sound grooves and is for the purpose of forming a record from a moldable plastic.

A cake 6 is placed between the upper half 2 and lower half 4 of the movable mold. The cake 6 is a transparent moldable plastic such as polyvinyl. Onto the cake 6 is placed an opaque sheet 8 which includes a picture printed on at least one side thereof. In some instances a picture may be provided on both sides of the sheet 8. A sheet 10 of transparent plastic is then placed on top of the sheet 8.

At this point, the record is ready for pressing. As indicated by the arrows in FIG. 1, the upper mold half 2 is pressed against the lower half mold 4. The cake 6 spreads out to fill the mold and the sound grooves provided in the upper and lower halves 2 and 4 are pressed into the exterior surfaces of the cake 6 and the transparent moldable plastic sheet 10. In addition, the transparent moldable plastic sheet 10 is fused to the cake 6 by the heat and compressive forces within the record press mold as shown in FIG. 2.

Figure 3:
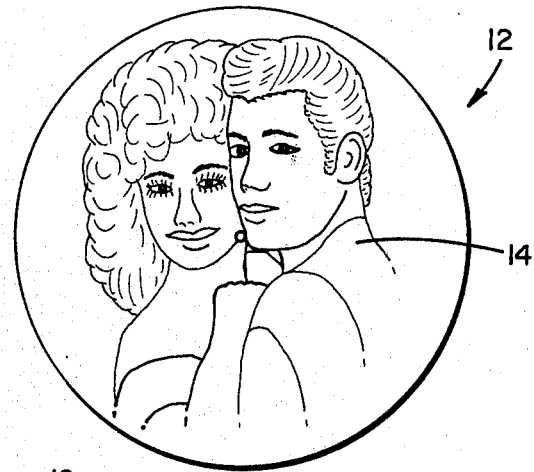
FIG. 3 is a top plane view illustrating a result product made by means of a process for making a plastic record in accordance with the teachings of the present invention.

The upper half 2 is then moved away from the lower half 4 and the completed record 12 with picture 14 as shown in FIG. 3 is removed from the record press.

Figure 4:
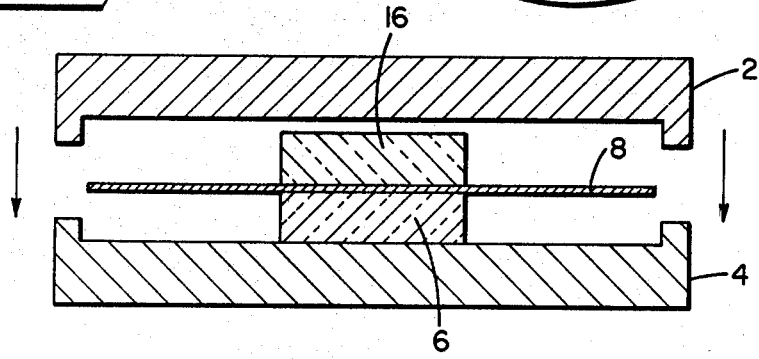
FIG. 4 is a cross sectional view illustrating a second embodiment of a process for making a plastic record in accordance with the teachings of the present invention.

Referring to FIG. 4, shown therein is a second embodiment of a process for making a plastic record in accordance with the teachings of the present invention. In FIG. 4, a cake 6 for transparent moldable plastic is again placed in the record press mold and a sheet having a picture printed thereon is placed on top of the cake 6. Then a cake 16 of transparent moldable plastic is placed on top of the sheet 8. This time the upper half mold 2 is pressed against the lower half 4 as indicated by the arrows and the result in product is substantially the same as is illustrated in FIGS. 2 and 3.

It should be apparent from the above description, that the process of the present invention produces a record having a picture therein and the process is simple and inexpensive.

It should be apparent to one skilled in the art that the above described embodiment is merely illustrative of but a few of the many possible specific embodiments which represent the application of the principles of the present invention. Numerous and varied other arrangements can be readily devised by those skilled in the art without departing from the spirit and scope of the invention.

I claim:

1. A process for making a plastic record comprising the ordered steps of:
    placing a cake of transparent moldable plastic in a press having grooves for impressing sound grooves into said plastic;

placing an opaque sheet of material having a picture printed on at least one side thereof onto the cake in the record press;

placing a transparent moldable plastic on top of the opaque sheet of material; and pressing the combined cake, sheet and transparent plastic in said record press whereby a transparent record having a picture and sound grooves contained therein is formed.

2. A process for making a plastic record according to claim 1, wherein said transparent moldable plastic for placing on top of said opaque sheet of material is a sheet of transparent moldable plastic.

3. A process for making a plastic record according to claim 2, wherein said opaque sheet of material has a picture printed on both sides.

4. A process for making a plastic record according to claim 1, wherein said transparent moldable plastic for placing on top of said opaque sheet of material comprises a cake of transparent moldable plastic.

5. A process for making a plastic record according to claim 4, wherein said transparent moldable plastic is polyvinyl.

6. A process for making a plastic record according to claim 5, wherein said opaque sheet of material has a picture printed on both sides.

* * * * *